(12) United States Patent  
Sueoka et al.

(10) Patent No.: US 7,396,286 B2
(45) Date of Patent: Jul. 8, 2008

(54) BOOT FOR CONSTANT VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama-ken (JP)

( * ) Notice: Subject to any disclaimer, the term of this patent is extended or adjusted under 35 U.S.C. 154(b) by 197 days.

(21) Appl. No.: 11/016,853

(22) Filed: Dec. 21, 2004

(65) Prior Publication Data

US 2006/0133888 A1   Jun. 22, 2006

(51) Int. Cl.
*F16D 3/84* (2006.01)

(52) U.S. Cl. ........................................ 464/175; 464/905

(58) Field of Classification Search ................. 277/634, 277/636, 637; 464/173, 175, 905
See application file for complete search history.

(56) References Cited

U.S. PATENT DOCUMENTS

| 5,529,538 | A | 6/1996 | Schulz et al. | |
| 6,921,091 | B2 * | 7/2005 | Neviani | 277/634 |
| 7,056,219 | B2 * | 6/2006 | Toriumi et al. | 464/175 |

FOREIGN PATENT DOCUMENTS

| DE | 10161987 A1 | 7/2003 |
| FR | 2 818 338 | * 6/2002 |
| JP | 62-16541 | 4/1987 |
| JP | 2-224463 | 2/1990 |
| JP | 2000-337399 | 12/2000 |
| JP | 2002-39208 | 2/2002 |
| JP | 2002-286048 | 10/2002 |
| JP | 2003-041317 | 2/2003 |
| JP | 2003-202034 | 7/2003 |

OTHER PUBLICATIONS

Catalogue, "Constant Velocity Universal Joints or Automobiles", CAT No. 5601-II/JE, p. 9, issued Feb. 3, 2000 by NTN Co., Ltd.

* cited by examiner

*Primary Examiner*—Greg Binda
(74) *Attorney, Agent, or Firm*—Jacobson Holman PLLC (57) ABSTRACT

Shifting prevention and sealing property between a boot for a constant velocity universal joint, having a thick portion on the inner peripheral surface of a large-diameter-side end portion and the outer peripheral surface of a tripod joint casing are enhanced, costs for preparing the casing are reduced, and the preparation is facilitated. One or a plurality of seal lips are disposed in the form of protrusions over the whole periphery in a peripheral direction of the inner peripheral surface of the large-diameter-side end portion of the boot for the tripod joint, into which the casing of the tripod joint is inserted, shift preventive walls are disposed on opposite sides of an axial direction via the seal lip, and inner diameters of the shift preventive walls are formed to be smaller than those of base portions of the seal lips. The shift preventive walls and the seal lips are disposed right under a band fastening portion.

4 Claims, 7 Drawing Sheets

BOOT FOR CONSTANT VELOCITY UNIVERSAL JOINT

BACKGROUND OF THE INVENTION

1. Field of the Invention

The present invention relates to boots for protecting constant velocity universal joints disposed, for example, on a driving shaft (power transmission shaft) or the like which transmits a power to an axle hub from a differential gear of an automobile, particularly to a seal between an outer peripheral surface of an outer housing of a constant velocity universal joint and an inner peripheral surface of a large-diameter-side end portion of a boot fixed to the outer peripheral surface.

2. Description of the Related Art

Constant velocity universal joints have been used, for example, in opposite end portions of a driving shaft for an automobile. Moreover, flexible boots which cover bent portions of the constant velocity universal joints are attached in order to seal grease for lubricating the constant velocity universal joints and prevent invasion of foreign matters such as dust and water from the outside. Large-diameter-side and small-diameter-side end portions of the boot are usually fastened and fixed to an outer peripheral surface of an outer housing (casing) of the constant velocity universal joint on a differential gear (differential) side or a hub side, and an outer peripheral surface of a drive shaft portion by bands, respectively.

In general, the casing whose outer peripheral surface has a simple cylindrical shape is used in the constant velocity universal joint on the hub side (outboard side).

In this case, the inner peripheral surface of the boot for the constant velocity universal joint, and the outer peripheral surface of the casing of the constant velocity universal joint are prevented from being shifted from each other, and are sealed, for example, by engagement of a protrusion protruded/disposed on the inner peripheral surface of the large-diameter-side end portion of the boot for the constant velocity universal joint with a peripheral groove disposed in the outer peripheral surface of the casing over a peripheral direction.

On the other hand, in the constant velocity universal joint on the differential side (inboard side), a tripod joint (triport joint) is generally used constituted by axially slidably disposing, for example, three sets of rollers on a shaft portion of the driving shaft in a trifurcated manner.

In order to achieve thinning and lightening, for example, three axial-direction grooves disposed in an axial direction of the outer peripheral surface are formed in the casing of the tripod joint in a scattered manner in the peripheral direction. In this case, for example, a thick portion whose shape viewed in the axial direction protrudes in a circular shape is formed in the inner peripheral surface of the large-diameter-side end portion of the boot for the constant velocity universal joint in such a manner as to be adapted to the groove surface of the axial-direction groove of the casing.

When the tripod joint is used in this manner, it is also considered that the outer peripheral surface of the casing and the inner peripheral surface of the boot are prevented from being shifted, and sealed by the engagement of the peripheral groove formed in the casing with the protrusion formed on the boot side in the same manner as in the outboard side.

However, when the groove of the peripheral direction is formed in the groove surface of the axial-direction groove in the casing outer peripheral surface, there is a problem that machining at the time of preparation of the casing becomes remarkably complicated and this increases costs.

To solve the problem, the following technical means for preventing the shifting and achieving the sealing on the differential side (inboard side) are known.

That is, a concave groove for fastening a band is disposed in the outer periphery of the large-diameter-side end portion, a plurality of circumferential seal lips are disposed on the large-diameter-side end portion inner periphery positioned right under the concave groove, the large-diameter-side end portion is fastened via fastening means such as a band from the outer peripheral side, and protruding end portions of the seal lips are pressed onto the outer peripheral surface of the casing to thereby achieve the sealing. Moreover, a shift preventive concave portion is disposed in a circumferential direction inside portions in which the seal lips are arranged in the axial direction of the boot, and a protruding portion to engage with the shift preventive portion is disposed on the outer peripheral surface end portion of the casing of the tripod joint to thereby prevent the shifting (e.g., FIG. 4, etc. of Japanese Utility Model Laid-Open No. 62-16541, FIG. 1, etc. of Japanese Patent Application Laid-Open No. 2003-202034).

However, these prior techniques have the following disadvantages.

① Since the seal lips are disposed in positions deviating from the shift preventive portion in the axial direction, a boot volume is large, materials are wasted, and costs are raised. Moreover, an insertion property of the boot into the casing has been unsatisfactory.

② Since the shift preventive portion is consciously disposed in a position deviating from a band fastening position in the axial direction, the shift toward the small-diameter-side end portion of the boot can be regulated, but a force for regulating the shift toward the large-diameter-side end portion is remarkably small.

Furthermore, the technique described in Japanese Patent Application Laid-Open No. 2003-202034 also has the following disadvantages.

③ In a structure in which the bead (protruding portion) is disposed in the axial-direction groove of the outer peripheral surface of the casing of the tripod joint, and the concave portion to engage with the bead is disposed in the inner periphery of the large-diameter-side end portion of the boot, the insertion property of the boot into the casing is further deteriorated by the presence of the bead.

④ After forging, lathe working is not performed. Therefore, concentricity of a core of the attached boot with the driving shaft present in the casing is deteriorated, and boot lifetime is shortened in many cases.

⑤ Since the concave portion to engage with the bead is also disposed in the thick portion of the large-diameter-side end portion, the concave portion constitutes an undercut at a forming time, mold releasing has been difficult, and forming properties have been unsatisfactory.

⑥ Since the bead remains to be formed by forging, dimensional precision fluctuation is larger than that in the lathe working. Unless the concave portion on the boot side is provided with backlash, the portion falls on the bead. Even when the bands are fastened, the seal does not work in some cases.

The present invention has been developed in consideration of the problem of the conventional technique, and an object thereof is to prevent shifting and enhance sealing properties between a boot for a constant velocity universal joint, having a thick portion formed to protrude from the inner peripheral surface of a large-diameter-side end portion, and the outer peripheral surface of a tripod joint casing, further enhance insertion properties of the boot into the casing, and reduce costs of boot materials, so that cost reduction, casing preparing cost reduction, and manufacturing facilitation are achieved.

SUMMARY OF THE INVENTION

As technical means for achieving the above-described object, according to the present invention, there is provided a boot for a tripod joint constituted by forming a plurality of axial-direction grooves in a casing outer peripheral surface, the boot comprising: a large-diameter-side end portion into which a casing of the tripod joint is inserted; a small-diameter-side end portion into which a shaft portion connected to the tripod joint is inserted; and a bellows portion formed between the large-diameter-side end portion and the small-diameter-side end portion, the large-diameter-side end portion being fastened/fixed to the tripod joint casing from an outer peripheral surface side via a band, the large-diameter-side end portion comprising: a thick portion formed facing the axial-direction groove of the casing and protruding from the inner peripheral surface; one or a plurality of seal lips disposed in the form of a protrusion over the whole periphery in a peripheral direction of the inner peripheral surface of the large-diameter-side end portion; and shift preventive walls which are disposed on opposite sides of the axial direction via the seal lip and whose inner diameters are formed to be smaller than those of base portions of the seal lips, and the shift preventive walls and the seal lips are disposed right under a band fastening portion.

According to the present invention, since the seal lips are disposed between the front and back shift preventive walls in the axial direction, a boot volume of the large-diameter-side end portion can be reduced, and materials are not wasted.

Moreover, since the volume is reduced, the thickness is reduced, and an insertion property into the casing is also satisfactory. According to the present invention, unlike the conventional technique, since any bead is not disposed in the axial-direction groove of the casing outer peripheral surface of the tripod joint, the insertion property into the casing is not impaired. In the present invention, since the front/back shift preventive walls and the seal lips are disposed right under the band fastening portion, the fastening force by the band acts on both the front/back shift preventive walls and the seal lips. Therefore, there is not any shift, and a sealing property is superior. According to the present invention, since the large-diameter-side end portion is thin, and has flexibility, the shift preventive wall, which is an undercut, does not impair a forming property.

Furthermore, machining (lathe working) to be performed with respect to the outer peripheral surface formed by forging the casing of the tripod joint is performed with respect to a peripheral-direction groove having the surface which engages with the shift preventive wall of the boot and a tapered surface of an edge on an opening end portion side only, and is accordingly minimized. The surface portion which abuts on the seal lip does not have to be formed by cutting during the machining, or is worked to the minimum. Therefore, a cutting allowance at a machining time is reduced, and the working of the casing can be simplified.

Additionally, both edges along the axial-direction groove formed in the outside of the casing are usually R-chamfered, and rounded/finished, but the above-described seal lip is disposed across this chamfered portion. In this case, for example, the peripheral-direction groove is formed in the portion other than the axial-direction groove in the outer surface of the casing. As compared with a case where the seal lip is allowed to abut on the groove bottom, a bend angle of the seal lip in the chamfered portion can be reduced, and accordingly a sealing performance is enhanced.

Moreover, in the above-described case, the base portion of the seal lip may be disposed on a surface portion in which the inner diameter of the inner peripheral surface of the large-diameter-side end portion is maximized.

Furthermore, the shift preventive wall may be constituted in such a manner that a protrusion formed on at least the portion other than the axial-direction groove in the casing of the constant velocity universal joint is engaged in such a manner as to be held from the front/back in the axial direction.

Additionally, at least two seal lips are disposed in parallel, and these two seal lips are formed in such a manner as to protrude from the surface portion whose inner diameter is substantially constant over a cylinder axial direction of the large-diameter-side end portion.

Moreover, the shift preventive wall may comprise a tapered surface formed in such a manner that the inner diameter is reduced as a distance from the seal lip increases.

According to the present invention, shift prevention and sealing performance between the boot for the constant velocity universal joint, having the thick portion formed in such a manner as to protrude from the inner peripheral surface of the large-diameter-side end portion, and the outer peripheral surface of the casing of the tripod joint are enhanced, and further the insertion property of the boot into the casing is enhanced. Moreover, cost reduction by reduction of costs of boot materials, reduction of costs for preparing the casing, and facilitation of the manufacturing can be achieved.

DESCRIPTION OF THE PREFERRED EMBODIMENT

An embodiment of a boot for a constant velocity universal joint, to which the present invention is applied, will be described hereinafter. It is to be noted that the present embodiment is simply one embodiment of the present invention, is not interpreted as limited to this embodiment, and can be changed in design within the scope of the present invention.

Figure 1:
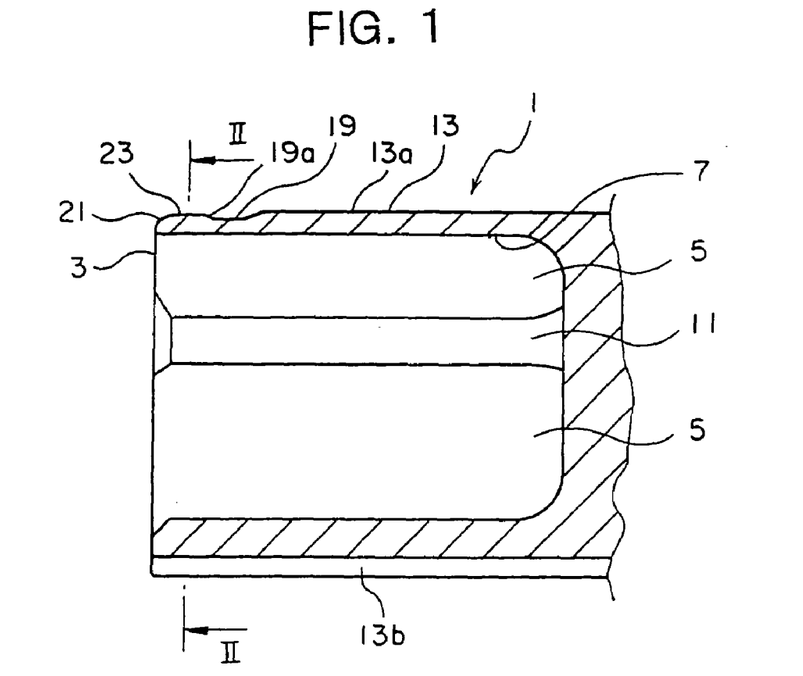
FIG. 1 is a transverse sectional view of a casing of a tripod joint attached to one embodiment of a boot for a constant velocity universal joint, to which the present invention is applied.
Figure 2:
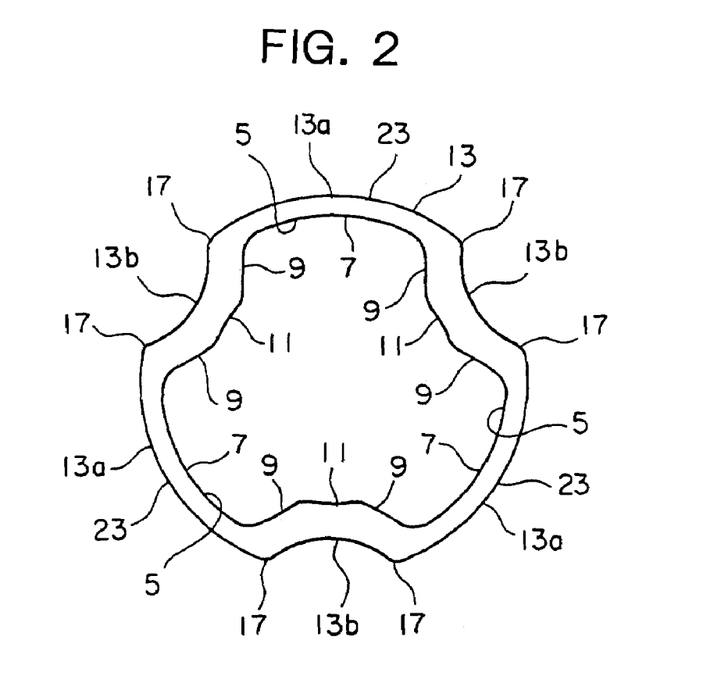
FIG. 2 is a sectional view along line II-II of FIG. 1.

First, a shape of a casing of a tripod joint to which the boot for the constant velocity universal joint of the present embodiment is attached will be described. FIG. 1 is a main part sectional view of the casing of the tripod joint. As shown in FIG. 1, a casing 1 of the tripod joint is entirely formed into a cylindrical shape, and the boot for the constant velocity universal joint is attached to one opening end portion 3. FIG. 2 is a II-II line sectional view of the casing 1 of the tripod joint shown in FIG. 1. For example, grooves 5 which contain three sets of rollers attached to a shaft portion of a driving shaft in a trifurcated manner are formed in three positions apart from one another by 120° in a peripheral direction in the inner peripheral surface of the casing 1. The groove 5 has a substantially constant section shape in an axial direction, and comprises a groove bottom portion 7 whose section is formed in a circular concave surface, and groove side surface portions 9 formed on opposite sides of the peripheral direction. Moreover, a surface portion 11 whose inner diameter from an axial center is smallest in the inner peripheral surface of the casing 1 and which is disposed in such a manner as to be directed toward the axial center of the casing 1 is formed between the adjacent groove side surface portions 9 of the adjacent grooves 5.

Moreover, in an outer peripheral surface 13 of the casing 1 corresponding to the backside of the groove bottom portion 7, cylindrical surfaces 13a formed into cylindrical surface shapes substantially concentric with the axial center of the casing 1, and axial-direction grooves 13b dented into circular sectional shapes from opposite sides of the cylindrical surfaces 13a are formed. That is, the outer peripheral surface 13 of the casing 1 is constituted of three cylindrical surfaces 13a displaced every 120° in the peripheral direction, and three axial-direction grooves 13b disposed between the respective cylindrical surfaces 13a. As shown in FIG. 2, boundaries 17 between the cylindrical surfaces 13a and the axial-direction grooves 13b are R-chamfered, rounded, and finished.

Furthermore, as shown in FIG. 1, a peripheral-direction groove 19 is formed in the cylindrical surface 13a of the outer peripheral surface 13 in the vicinity of the opening end portion 3 of the casing 1, and a surface portion (protrusion) 23 is formed in a desired range between the peripheral-direction groove 19 and the opening end portion 3.

This peripheral-direction groove 19 has a trapezoidal sectional shape, for example, as shown in FIG. 1, and its width is formed to be narrower as depth increases. Moreover, a tapered face 21 is formed on an edge on the side of the opening end portion 3.

Shift preventive walls (tapered surfaces 51, 53) of a boot 1 described later engage with a tapered surface 19a and the tapered face 21 in the vicinity of the end portion 3 of the peripheral-direction groove 19.

It is to be noted that the peripheral-direction groove 19 or the tapered face 21 is not formed in the above-described axial-direction groove 13b even in the outer surface of the casing 1.

Figure 3:
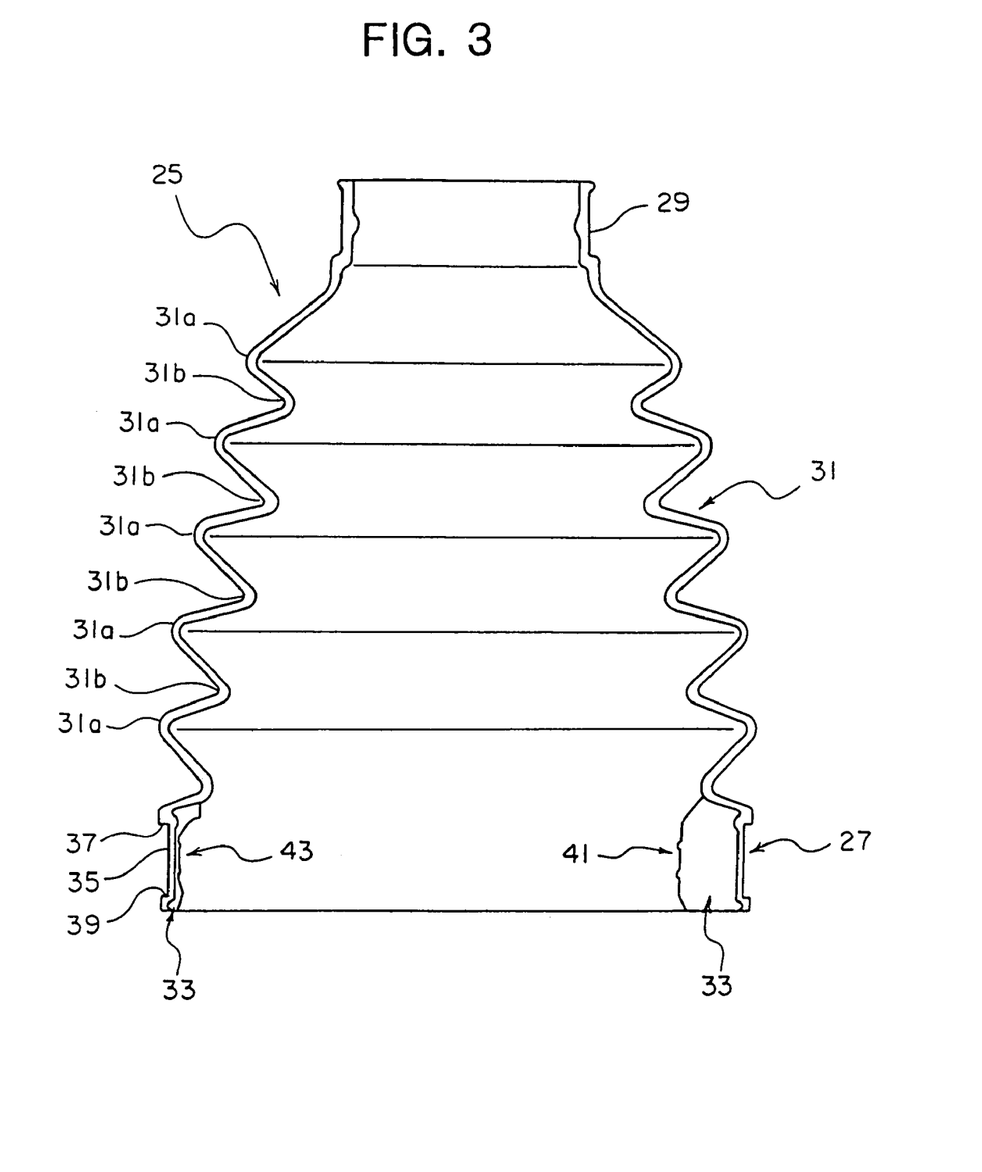
FIG. 3 is a vertical sectional view of a first embodiment of the boot for the constant velocity universal joint, to which the present invention is applied.

Next, FIG. 3 is an elevation view showing an appearance of the boot for the constant velocity universal joint of the present embodiment. As shown in FIG. 3, a boot 25 is entirely formed into a cylindrical shape, and has a large-diameter-side end portion 27 fixed to the side of the casing 1 of the constant velocity universal joint, and a small-diameter-side end portion 29 fixed to a shaft portion side (not shown) of the driving shaft. Moreover, bellows 31 having flexibility and constituted to be bendable are formed between the large-diameter-side end portion 27 and the small-diameter-side end portion 29. It is to be noted that in the present embodiment, the boot 25 is formed of a resin having elasticity, such as thermoplastic polyester-based elastomer, and a grommet 33 disposed on an inner peripheral side of the large-diameter-side end portion is formed of a resin having hardness lower than or equal to that of a portion other than the boot 25, such as an outer peripheral side of the large-diameter-side end portion. However, the present invention is not limited to this example. For example, a boot 25 main body including an outer peripheral portion of the large-diameter-side end portion, and the grommet may be integrally formed of the same resin material, for example, by injection forming or the like. The grommet 33 may be formed of rubber.

The bellows 31 are constituted in such a manner that convex portions 31a and concave portions 31b extending in the peripheral direction are repeatedly arranged in a cylinder axial direction of the boot 25, that is, a vertical direction in FIG. 3. That is, sections of the bellows 31 are convex on the outer peripheral side in the convex portions 31a, and sections of the bellows 31 are convex on the inner peripheral side in the concave portions 31b. In the present embodiment, for example, five convex portions 31a are disposed, and the corresponding concave portions 31b are disposed on a large-diameter-side end portion 27 side of each convex portion 31a. Moreover, the diameters of the convex portions 31a and the concave portions 31b are set to be large toward the large-diameter-side end portion 27 from the small-diameter-side end portion 29. As a result, the bellows 31 are entirely formed into a substantially conical shape.

A surface portion 35 formed into a substantially constant outer diameter over the axial direction is disposed in the outer peripheral surface of the large-diameter-side end portion 27. The surface portion 35 is used as a band fastening portion to which a band 63 (shown in FIGS. 7, 8) for fastening the boot 25 with respect to the surface portion 23 of the casing 1 of the tripod joint and the groove surfaces of the axial-direction grooves 13b is attached. This surface portion will be described as the band fastening portion 35.

Stepped portions 37, 39 for preventing the band from shifting in the axial direction are formed on opposite ends of the band fastening portion 35 in the cylinder axial direction of the boot 25.

Figure 4:
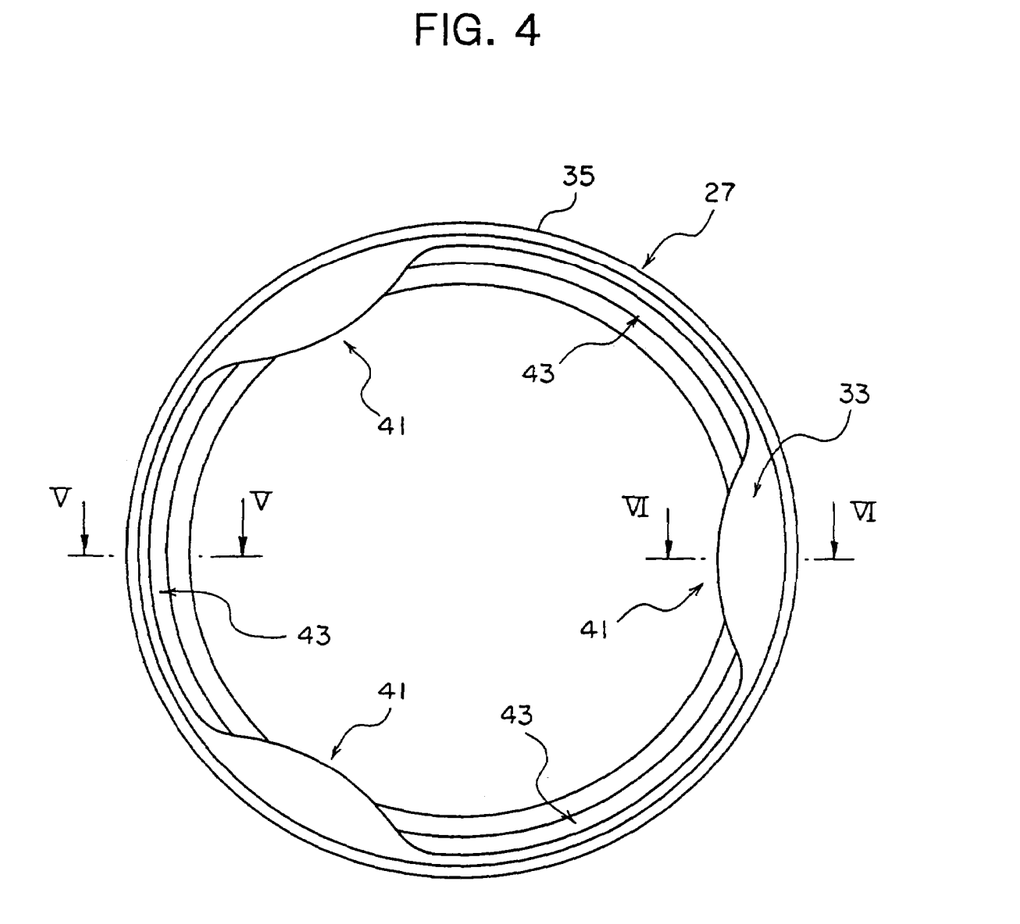
FIG. 4 is a diagram of the boot viewed from an end face side of a large-diameter-side end portion.

Moreover, FIG. 4 is a diagram of the boot 25 viewed from an end face side of the large-diameter-side end portion 27. As shown in FIG. 4, on the inner peripheral surface of the large-diameter-side end portion 27, thick portions 41 protruded in circular shapes are formed in such a manner as to be adapted to the groove surfaces of the axial-direction grooves 13b formed in the outer surface of the casing 1. It is to be noted that regions other than the thick portions 41 on the inner surface of this large-diameter-side end portion 27 will be hereinafter referred to as thin portions 43 for the sake of convenience.

Figure 5:
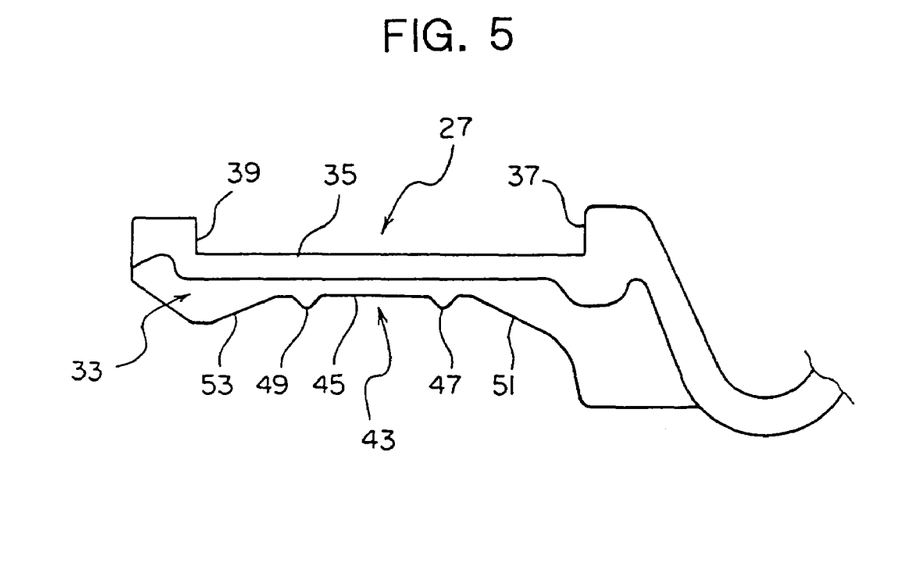
FIG. 5 is a sectional view along line V-V of FIG. 4.

FIG. 5 is a sectional view along arrows V-V of FIG. 4, and is an enlarged sectional view of the boot 25 in the thin portion 43 of the large-diameter-side end portion 27. As shown in FIG. 5, in the thin portion 43, the inner peripheral surface of the large-diameter-side end portion 27 is formed in such a manner as to be dented into a substantially trapezoidal sectional shape, and a surface portion 45 corresponding to an upper base of this trapezoidal shape and having a maximum inner diameter is formed in such a manner that its inner diameter is substantially constant over the axial direction.

Moreover, protruding seal lips (sealing lips) 47, 49 are formed on opposite end portions of the surface portion 45 in the axial direction.

The sectional shapes of the seal lips 47, 49 are triangular shapes whose protruding end portions (vertex portions) are rounded, for example, as shown in FIG. 5, but the present invention is not limited to this example. Moreover, the protruding end portions of the respective seal lips 47, 49 in the axial direction (width direction of the seal lips 47, 49) of the boot 25 are positioned substantially in middle portions of the seal lips.

Moreover, tapered surfaces 51, 53 are formed on the opposite sides of the boot 25 in the axial direction with respect to the surface portion 45 on which the above-described seal lips 47, 49 are disposed. When the boot 25 for the constant velocity universal joint of the present embodiment is inserted into the casing 1 of the above-described tripod joint, these tapered surfaces 51, 53 abut on the tapered face 21 formed on the edge of the opening end portion 3 of the casing 1, and the tapered surface 19a of the peripheral-direction groove 19 of the outer peripheral surface 13 of the casing 1, respectively. These abutting tapered surfaces 51, 53 function as shift preventive walls which prevent the boot 25 from shifting in the axial direction with respect to the casing 1. These tapered surfaces 51, 53 are formed in such a manner that their inner diameters decrease as distances from the seal lips 47, 49 increase.

It is to be noted that in the present embodiment, the tapered surfaces 51, 53 are disposed in consideration of the insertion property at an attaching time, but these surfaces may be vertically disposed in a diametric direction of the large-diameter-side end portion 27, and the design can be changed in the scope of the present invention.

These tapered surfaces 51, 53 will be described hereinafter as the shift preventive walls 51, 53.

Moreover, the seal lips 47, 49 and the shift preventive walls (tapered surfaces) 51, 53 are disposed right under the band fastening portion 35.

Figure 6:
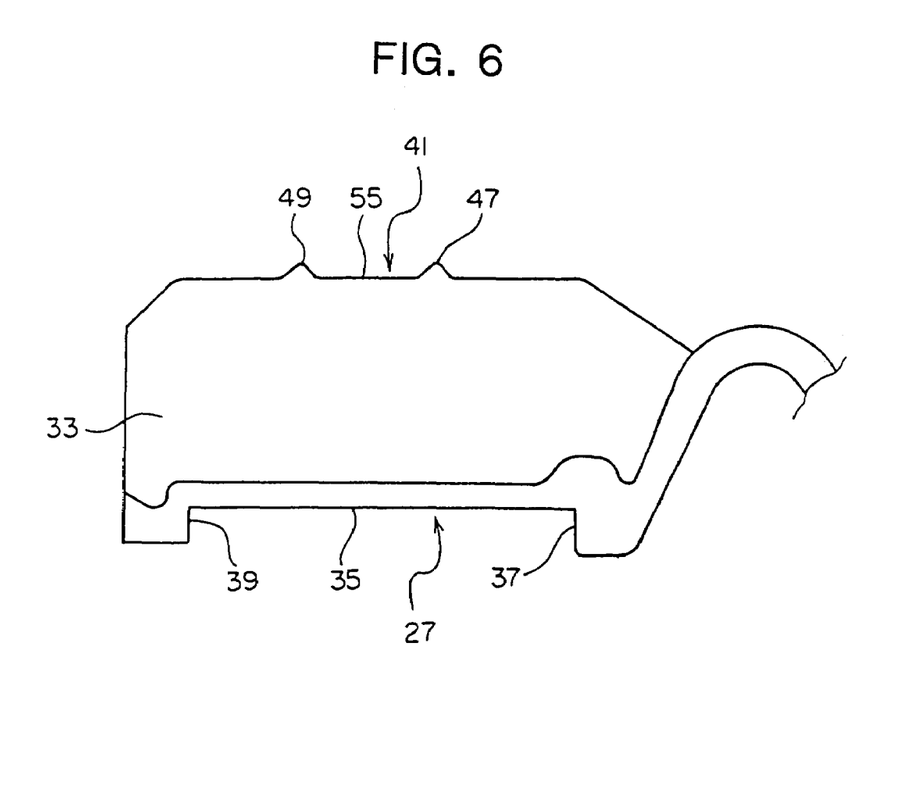
FIG. 6 is a sectional view along line VI-VI of FIG. 4.

Moreover, FIG. 6 is a sectional view along arrows VI-VI of FIG. 4, and is an enlarged sectional view of the boot 25 in the thick portion 41 of the large-diameter-side end portion 27.

As shown in FIG. 6, in the present embodiment, the shift preventive walls (tapered surfaces) 51, 53 like the thin portions are not disposed on the thick portion 41, but the seal lips 47, 49 are also formed on the surface 55 of the thick portion 41.

That is, the seal lips 47, 49 are formed over the whole periphery of the inner peripheral surface of the large-diameter-side end portion 27 regardless of the thick portion 41 or the thin portion 43. It is to be noted that regions in which these seal lips 47, 49 are disposed are formed into substantially the same sectional shapes over the axial direction of the boot 25 on the surface 55 of the thick portion 41.

Figure 7A:
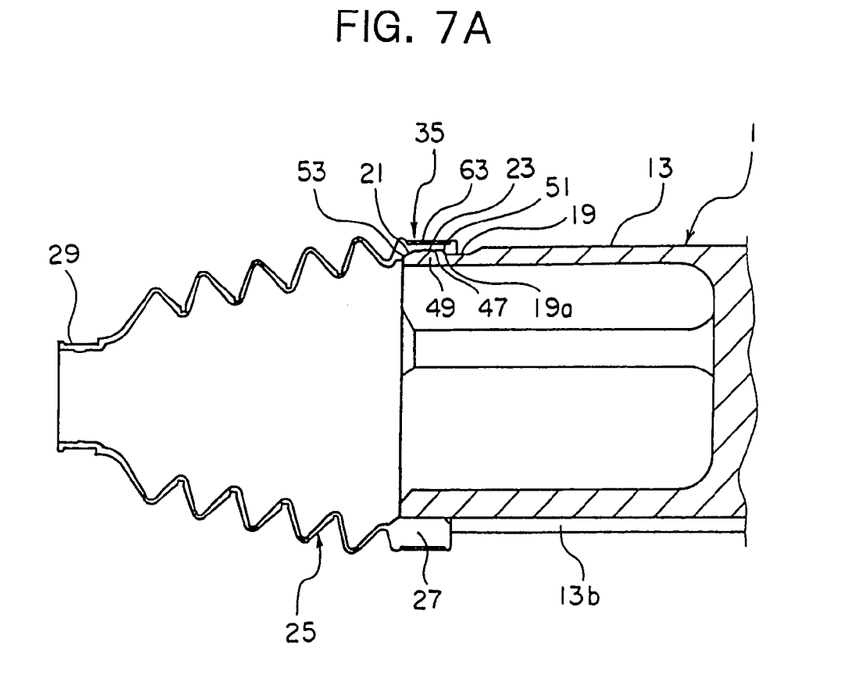
FIG. 7A is a sectional view showing a state in which the boot of the present embodiment is attached/fixed to the casing of the tripod joint.
Figure 7B:
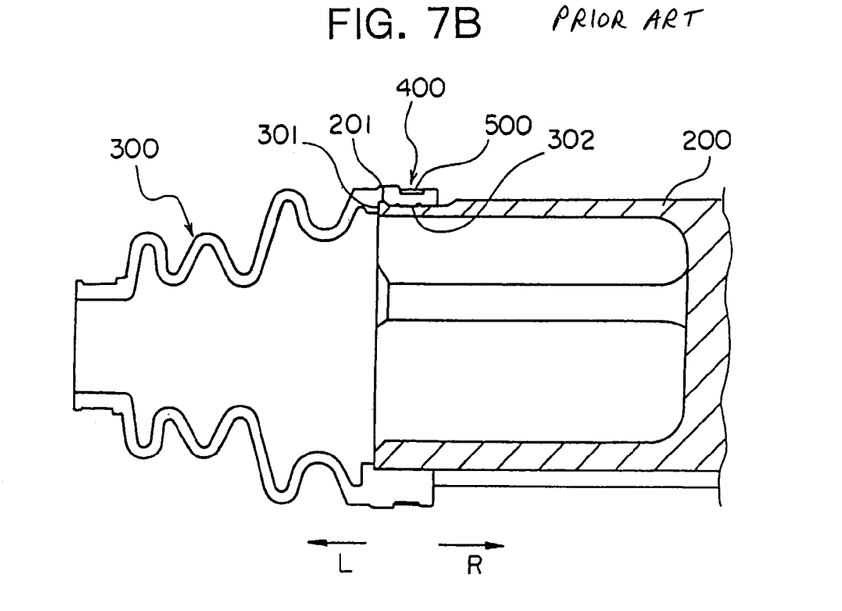
FIG. 7B is a diagram showing a relation between a conventional boot and the casing of the tripod joint.
Figure 8A:
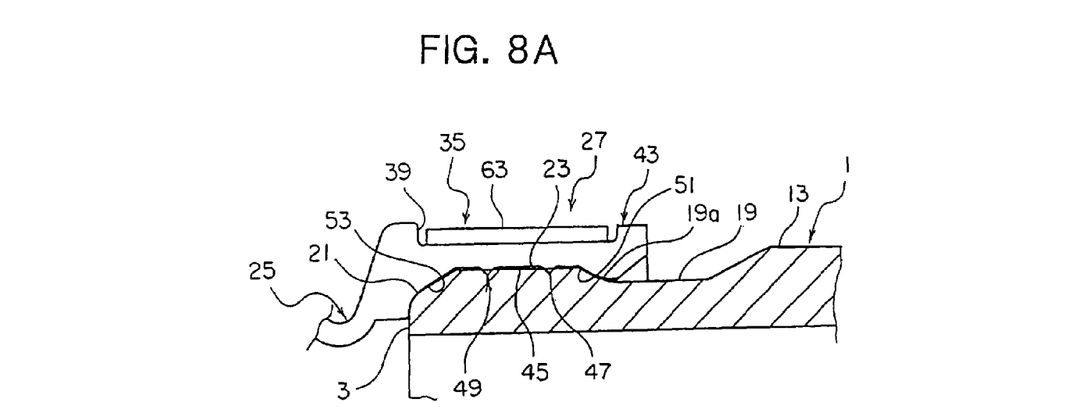
FIG. 8A is an enlarged sectional view of a main part of FIG. 7A.
Figure 8B:
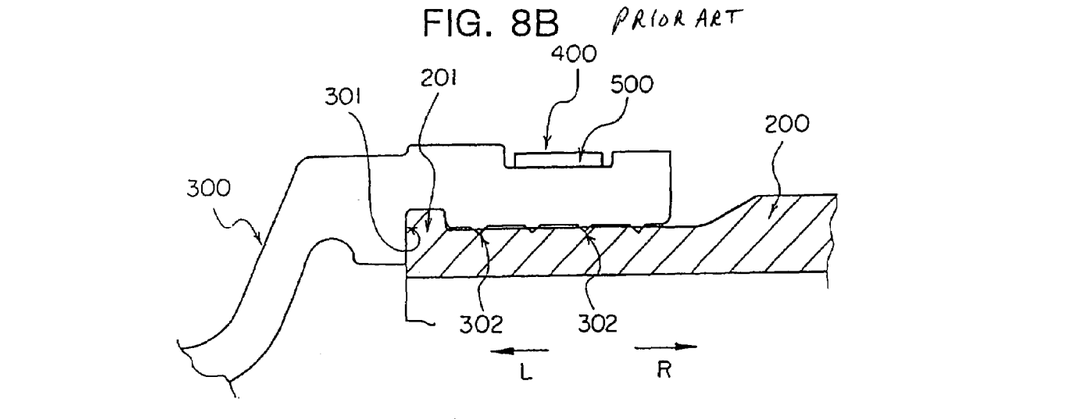
FIG. 8B is an enlarged sectional view of a main part of FIG. 7B.

FIGS. 7A and 7B show a state in which the boot is attached/fixed to the casing 1 of the tripod joint, FIG. 7A shows a relation between the boot for the constant velocity universal joint according to the present embodiment and the casing of the tripod joint, and FIG. 7B shows a relation between the conventional boot and the casing of the tripod joint. FIG. 8A is an enlarged sectional view of a main part of FIG. 7A, and FIG. 8B is an enlarged sectional view of a main part of FIG. 7B.

Accordingly, the present embodiment (FIGS. 7A and 8A) are compared with a conventional mode (FIGS. 7B and 8B) as follows.

In the present embodiment, the seal lips 47, 49 are disposed between the shift preventive walls 51 and 53. On the other hand, in the conventional mode, as confirmable from FIG. 8B, a shift preventive concave portion 301 is disposed in a position shifting inwards from a position in which a seal lip 302 is disposed in the axial direction of a boot 300. Moreover, a protrusion 201 which engages with the shift preventive concave portion 301 is disposed on an end portion of an outer peripheral surface of a casing 200 of the tripod joint. In this example, a required size of a boot is shown using the conventional technique, with materials being wasted, and an insertion connection with the casing is unsatisfactory. On the other hand, according to the present embodiment, the thickness of the boot is small, the resulting volume of the boot is also small, with materials not being wasted, and the connection with the casing is also superior.

Moreover, in the conventional technique, the above-described shift preventive structure (201 and 301) are consciously shifted from a band fastening portion 400 (500 denotes a band in the figure). Therefore, even when the shift of the boot 300 toward the small-diameter-side end portion (shift in an L direction in the figure) can be regulated, a force for regulating the shift toward the large-diameter-side end portion (shift in an R direction in the figure). On the other hand, in the present embodiment, since the shift preventive walls 53, 51 and the seal lips 49, 47 are disposed right under the band fastening portion 35, a fastening force of the band 63 acts on the front/back shift preventive walls 53, 51 and the seal lips 49, 47. Therefore, the shift in any direction before/after, relative to the axial direction, can also be regulated, and a sealing performance is also remarkably enhanced.

As described above, according to the present embodiment, it is sufficient to perform the machining on the outer peripheral surface 13 of the casing 1 of the constant velocity universal joint only with respect to the peripheral-direction groove 19 and the tapered face 21 excluding unavoidably performed surface finishing with a micro cutting allowance with respect to a forged surface. Therefore, there is an effect that the working at the time of preparation of the casing 1 of the constant velocity universal joint can be simplified.

Figure 8C:
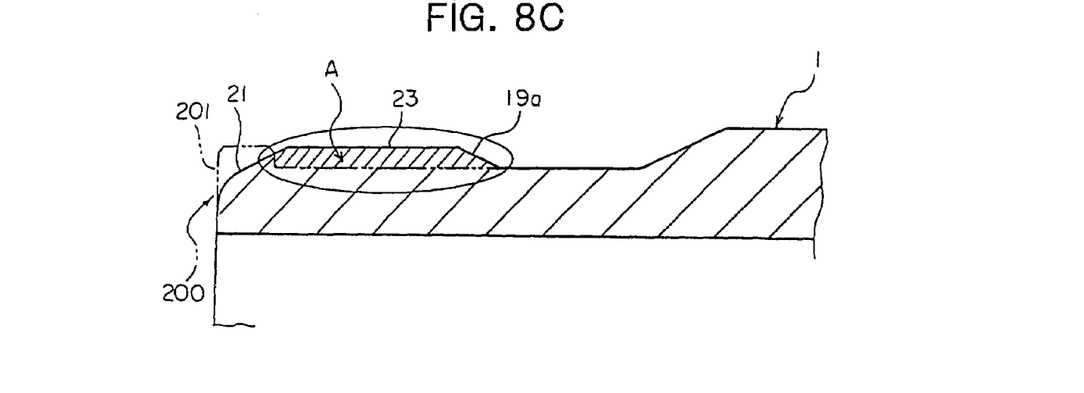
FIG. 8C is a diagram showing a state in which the casing (portion shown by a solid line) of the tripod joint for use in the present embodiment is superimposed on the casing (portion shown by a two-point chain line) of the tripod joint for use in a conventional mode to compare cutting allowances.

FIG. 8C shows a state in which the casing 1 (portion shown by a solid line) of the tripod joint for use in the present embodiment is superimposed on the lathe-worked casing 200 (portion shown by a two-point chain line) of the tripod joint for use in the conventional mode to compare the cutting allowance. Since a portion shown by slant lines A in the figure does not have to be cut in the present embodiment, great cost savings can be expected.

Figure 9:
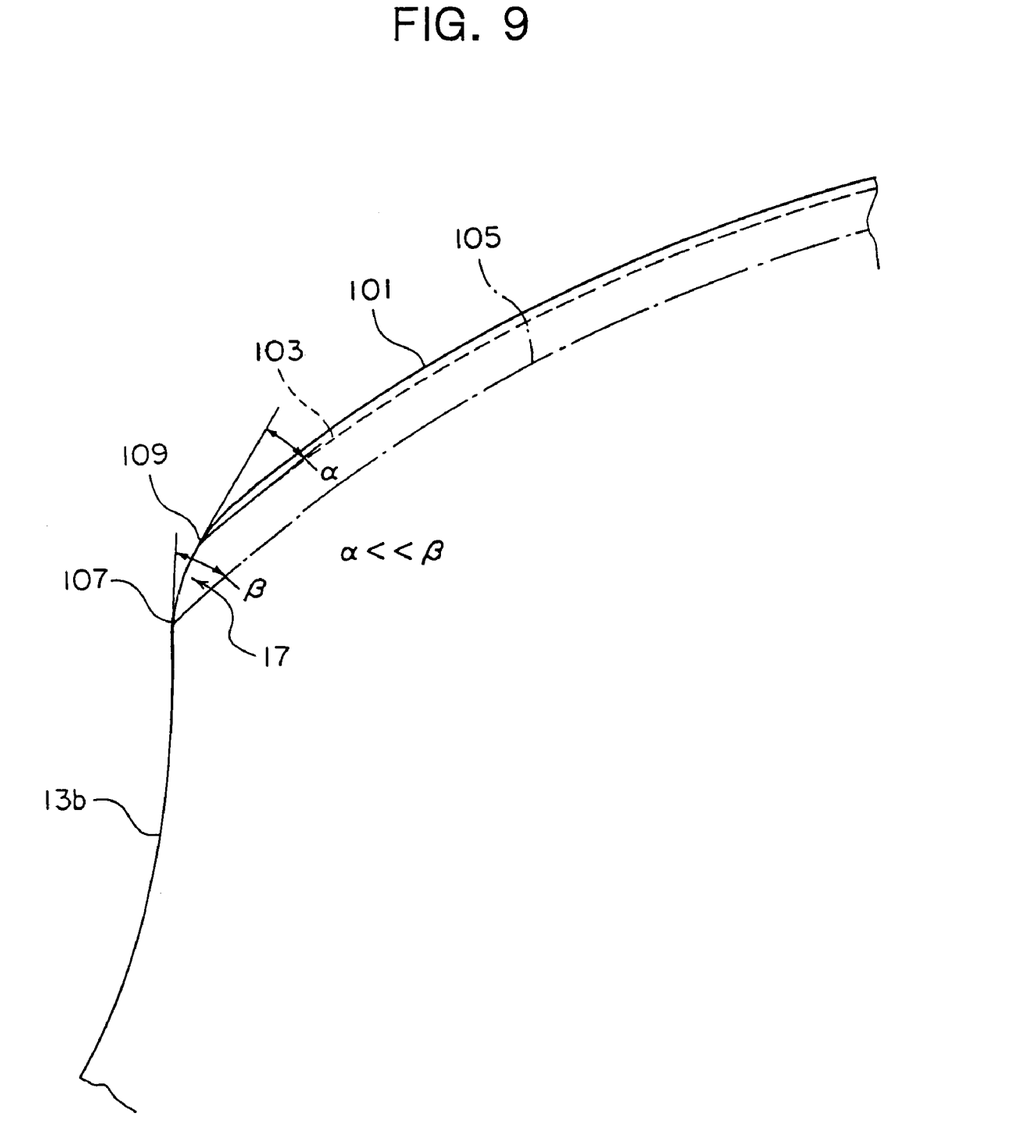
FIG. 9 is a diagram showing a shape of an outer peripheral surface (surface formed by forging) of an original material of the casing in the present embodiment, an axial-direction view shape of a surface portion formed by machining the original material, and an axial-direction view shape of a groove bottom surface.

Moreover, the seal lips 47, 49 are allowed to abut on the surface portion (protrusion) 23 of the casing 1 of the tripod joint, having a large diameter. Therefore, the bend angle in the boundary 17 between the portion contacting the surface portion (protrusion) 23 and the portion contacting the axial-direction groove 13b is reduced in each of the seal lips 47, 49. Accordingly, the sealing performance is enhanced. This principle will be described with reference to FIG. 9. FIG. 9 is a diagram showing a shape of an outer peripheral surface (surface formed by forging) of an original material of the casing 1 in the present embodiment, an axial-direction view shape of the surface portion 23 (surface formed by machining the original material), an axial-direction view shape of the bottom surface of the peripheral-direction groove 19, and an axial-direction view shape of the groove surface of the axial-direction groove 13b. The outer peripheral surface shape of the original material of the casing 1 formed by the forging is shown by a solid line 101. The surface shape of the surface portion 23 of the casing 1 contacting the seal lips 47, 49 is shown by a broken line 103. Furthermore, the surface shape of the groove bottom surface of the peripheral-direction groove 19 is shown by one-dot chain line 105. Moreover, for example, the seal lips 47, 49 are constituted in such a manner as to abut on the peripheral-direction groove 19 whose outer diameter is formed to be small by cutting the surface of the casing 1. In this constitution, the seal lips 47, 49 are bent at a comparatively large angle β in a point 107 at which the groove bottom surface of the peripheral-direction groove 19 contacts the surface of the axial-direction groove 13b. When the seal lips 47, 49 are bent at the comparatively large angle in this manner, the sealing performance is supposed to drop in this bent portion. On the other hand, in the present embodiment, the seal lips 47, 49 are bent in a point 109 in which the surface of the surface portion 23 contacts the surface of the axial-direction groove 13b, but a bend angle α is comparatively smaller than that in the point 107, and therefore it is considered that the sealing performance can be enhanced.

Furthermore, according to the present embodiment, the thin portion 43 of the large-diameter-side end portion 27 between the surface portion 45 on the inner peripheral side and the band fastening portion 35 on the outer peripheral side which is the backside can be formed to be thin. Accordingly, the boot 25 can be lightened, and the materials for use can be reduced. Moreover, rigidity of the large-diameter-side end portion 27 drops, the portion becomes flexible, and therefore an attaching operation to the casing 1 is facilitated.

Additionally, the boot 25 comprising the small-diameter-side end portion 29, bellows 31, and large-diameter-side end portion 27 is mostly formed of a resin, but the grommet 33 is formed of a material having a hardness smaller than that of the resin forming the boot 25, and the seal lips 47, 49 are formed of the same material as that of the grommet 33. Therefore, the hardness of the seal lips 47, 49 can be lowered, accordingly a sufficient elastic deformation amount can be secured, and therefore the sealing performance can be remarkably enhanced.

It is to be noted that the present invention is not limited to the above-described embodiment, and can be appropriately changed in the scope of the present invention. For example, the protrusion which functions as the seal lip may be formed into another shape. The number of the protrusions is not limited to two as in the present embodiment, and may be smaller or larger. In this case, when the number of the protrusions is increased, the sealing performance can further be enhanced. Furthermore, the grommet may be formed of a rubber, another portion may be formed of a resin, and the whole boot may be formed of the rubber or the resin alone.

What is claimed is:

1. A boot for a tripod joint, the tripod joint having a plurality of axial-direction grooves formed at predetermined intervals in a peripheral direction in an outer peripheral surface of a casing with an outer housing having one end opening, and a peripheral direction groove and a protrusion portion between the peripheral direction groove and an opening end portion respectively formed on a surface portion of the outer peripheral surface other than a surface portion forming an axial direction groove, the boot comprising:
    a large-diameter-side end portion for receiving the casing of the tripod joint;
    a small-diameter-side end portion for receiving a shaft portion connected to the tripod joint; and
    a bellows portion formed between the large-diameter-side end portion and the small-diameter-side end portion,
    the large-diameter-side end portion being fastenable/fixable to the tripod joint casing from a side of the outer peripheral surface via a band,
    the large-diameter-side end portion including:
    a thick portion facing the axial-direction groove of the casing and protruding from an inner peripheral surface;
    one or a plurality of seal lips in a form of a protrusion over an entire periphery of the inner peripheral surface of the large-diameter-side end portion;
    the large-diameter-side end portion further including
    shift preventive walls disposed on opposite sides of the one or the plurality of seal lips and the shift preventive walls having inner diameters smaller than an inner diameter of base portions of the one or the plurality of seal lips,
    the shift preventive walls and the one or the plurality of seal lips being disposed right under a band fastening portion,
    the shift preventive walls connecting with the protrusion portion of the outer housing so as to be inserted in an axial direction.

2. The boot for the tripod according to claim 1, wherein the base portions of the one or the plurality of seal lips are disposed on a surface portion in which an inner diameter of the inner peripheral surface of the large-diameter-side end portion is maximized.

3. The boot for the tripod according to claim 1, wherein at least two seal lips are disposed in parallel, and the at least two seal lips are formed to protrude from a surface portion of the large-diameter-side end portion having an inner diameter substantially constant over an axial direction of the large-diameter-side end portion.

4. The boot for the tripod according to claim 1, wherein the shift preventive walls include a tapered surface formed to have an inner diameter of the shift preventive walls reduced as a distance from the one or the plurality of seal lips increases.

* * * * *